(12) United States Patent
Kim et al.

(10) Patent No.: US 11,005,764 B2
(45) Date of Patent: May 11, 2021

(54) METHODS AND SYSTEMS FOR TRANSMISSION CONTROL PROTOCOL (TCP) COMMUNICATIONS

(71) Applicant: The Board of Regents of the Nevada System of Higher Education on Behalf of the University of Nevada, Las Vegas, Las Vegas, NV (US)

(72) Inventors: Yoohwan Kim, Henderson, NV (US); Ju-Yeon Jo, Henderson, NV (US); Khanh D. Pham, Arlington, VA (US)

(73) Assignee: The Board of Regents of the Nevada System of Higher Education on Behalf of the University of Nevada, Las Vegas, Las Vegas, NV (US)

( * ) Notice: Subject to any disclaimer, the term of this patent is extended or adjusted under 35 U.S.C. 154(b) by 56 days.

(21) Appl. No.: 16/559,325

(22) Filed: Sep. 3, 2019

(65) Prior Publication Data
US 2020/0076740 A1    Mar. 5, 2020

Related U.S. Application Data

(60) Provisional application No. 62/725,667, filed on Aug. 31, 2018.

(51) Int. Cl.
*H04L 12/801* (2013.01)
*H04L 12/841* (2013.01)
*H04L 12/823* (2013.01)
*H04L 12/851* (2013.01)
*H04B 7/185* (2006.01)
*H04L 29/06* (2006.01)

(52) U.S. Cl.
CPC ....... *H04L 47/193* (2013.01); *H04B 7/18521* (2013.01); *H04L 47/2483* (2013.01); *H04L 47/283* (2013.01); *H04L 47/32* (2013.01); *H04L 63/0428* (2013.01)

(58) Field of Classification Search
CPC .............. H04B 7/18521; H04L 47/193; H04L 47/2483; H04L 47/283; H04L 47/32; H04L 63/0428; H04W 12/0013; H04W 28/0273; H04W 80/04
See application file for complete search history.

(56) References Cited

U.S. PATENT DOCUMENTS

2012/0005369 A1 *   1/2012   Capone .................. H04L 29/06
                                                    709/236

* cited by examiner

*Primary Examiner* — Kibrom T Hailu
*Assistant Examiner* — Bao G Nguyen
(74) *Attorney, Agent, or Firm* — Ballard Spahr LLP

(57) ABSTRACT

Methods and systems are disclosed for performing Transmission Control Protocol (TCP) communications. A TCP packet may be received. An artificial error may be added to the TCP packet to prevent the occurrence of a TCP meltdown.

20 Claims, 5 Drawing Sheets

METHODS AND SYSTEMS FOR TRANSMISSION CONTROL PROTOCOL (TCP) COMMUNICATIONS

CROSS REFERENCE TO RELATED PATENT APPLICATION

This application claims priority to U.S. Application No. 62/725,667 filed Aug. 31, 2018, which is herein incorporated by reference in its entirety.

BACKGROUND

Communications using satellites have a high latency and a high data error rate. Thus the performance of Transmission Control Protocol (TCP) is greatly impaired versus non-satellite communications. To improve satellite communications, Performance Enhancing Proxies (PEPs) can be deployed on both ends of the satellite links. However, a PEP cannot be used when the TCP traffic is encrypted. For example, the operation of PEPs is disabled when TCP traffic is encrypted by High Assurance Internet Protocol Encryptions (HAIPE). Thus, communicating via satellites using encrypted TCP packets results in very poor performance. Further, previous solutions have significant drawbacks such as additional hardware; sharing the encryption keys, which raises security issues; and compatibility issues with currently used satellite communications. These and other shortcomings are addressed by the disclosure herein.

SUMMARY

It is to be understood that both the following general description and the following detailed description are exemplary and explanatory only and are not restrictive, as claimed. Provided are methods and systems for TCP communications.

In one embodiment, a method comprises receiving a first Transmission Control Protocol (TCP) packet. The method further comprises encoding the first TCP packet. The encoded first TCP packet comprises first TCP flow information. The method also comprises encrypting the encoded first TCP packet. Additionally, the method comprises generating an external TCP packet. The encrypted TCP packet is a payload of the external TCP packet. The method also comprises transmitting the external TCP packet based on the TCP flow information. The method further comprises receiving a second TCP packet. Additionally, the method comprises adding an artificial error to the second TCP packet. The artificial error prevents occurrence of TCP meltdown. The method also comprises encoding the second TCP packet. The method further comprises encrypting the encoded second TCP packet. Additionally, the method comprises transmitting the encrypted second TCP packet. The encrypted second TCP packet does not reach an intended destination of the encrypted second TCP packet due to the artificial error.

In another embodiment, a system comprises an encoder and a packet generator. The encoder is configured to receive a first Transmission Control Protocol (TCP) packet. The encoder is also configured to encode the first TCP packet. The encoded first TCP packet comprises TCP flow information. The encoder is further configured to transmit the encoded first TCP packet. Additionally, the encoder is configured to receive a second TCP packet. The encoder is further configured to encode an artificial error in the second TCP packet. The artificial error prevents occurrence of TCP meltdown. Additionally, the encoder is configured to transmit the second TCP packet. The second TCP packet does not reach an intended destination of the second TCP packet due to the artificial error. The packet generator is configured to receive an encrypted TCP packet comprising the encoded first TCP packet. The packet generator is also configured to generate an external TCP packet. The encrypted TCP packet is a payload of the external TCP packet. Additionally, the packet generator is configured to transmit the external TCP packet based on the TCP flow information.

In a further embodiment, an apparatus comprises a processor, and a memory comprising processor executable instructions that, when executed by the processor, cause the apparatus to receive a first Transmission Control Protocol (TCP) packet. The processor executable instructions also cause the apparatus to encode the first TCP packet. The encoded first TCP packet comprises first TCP flow information. The processor executable instructions also cause the apparatus to encrypt the encoded first TCP packet. The processor executable instructions further cause the apparatus to generate an external TCP packet. The encrypted TCP packet is a payload of the external TCP packet. Additionally, the processor executable instructions cause the apparatus to transmit the external TCP packet based on the TCP flow information. The processor executable instructions also cause the apparatus to receive a second TCP packet. The processor executable instructions further cause the apparatus to add an artificial error to the second TCP packet. The artificial error prevents occurrence of TCP meltdown. Additionally, the processor executable instructions cause the apparatus to encode the second TCP packet. The processor executable instructions also cause the apparatus to encrypt the encoded second TCP packet. The processor executable instructions further cause the apparatus to transmit the encrypted second TCP packet. The encrypted second TCP packet does not reach an intended destination of the encrypted second TCP packet due to the artificial error.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
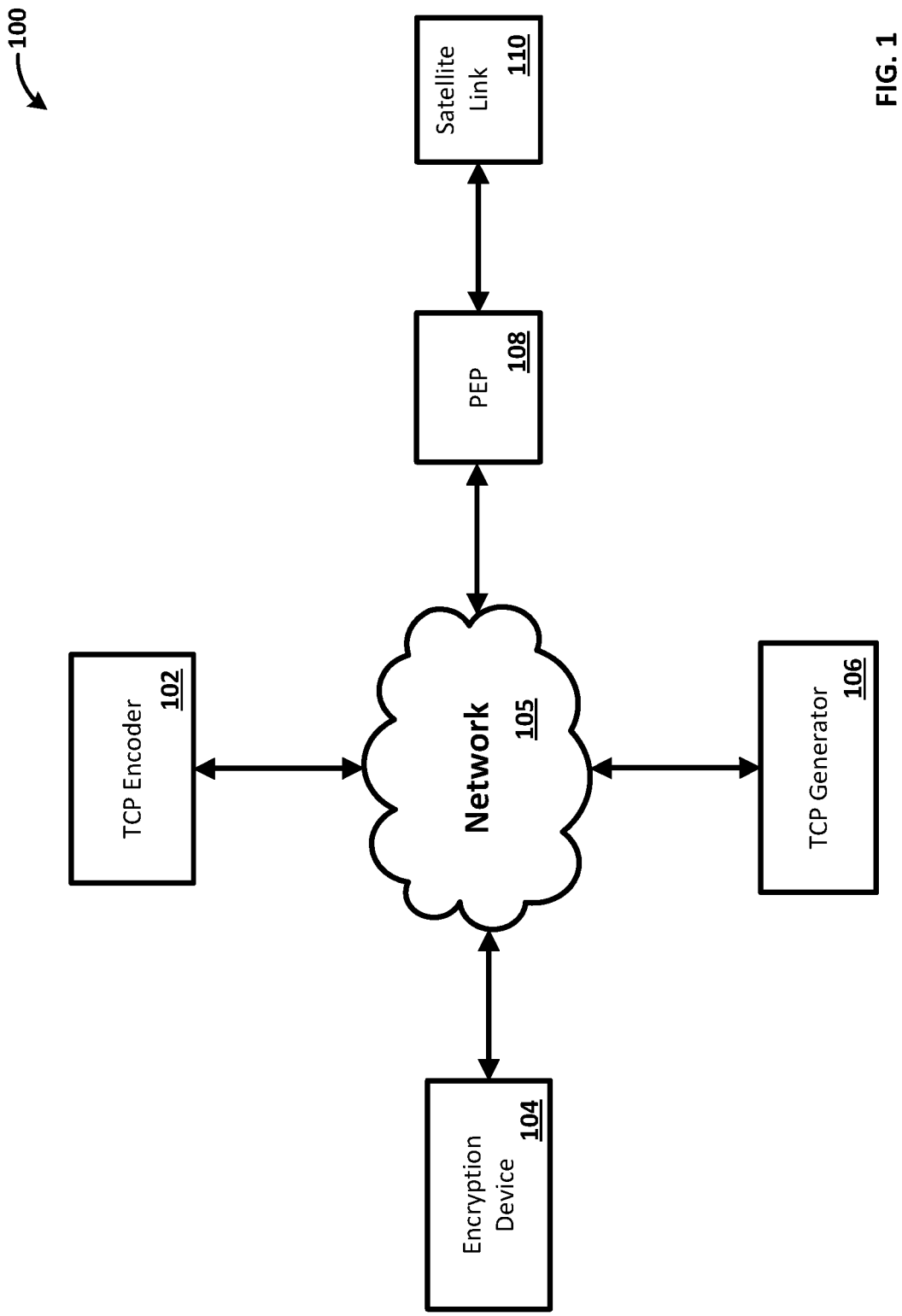
FIG. 1 is a block diagram illustrating an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In military communications, all data moving from a red core (secure intranet) to a black core (unsecure public network) must be encrypted using High Assurance Internet Protocol Encryptions (HAIPE), an IPsec encryption device. When HAIPE is used in a satellite link that employs PEPs, HAIPE presents a special challenge since IPsec encrypts TCP protocol headers, which makes it impossible for PEPs to operate normally. Thus, when HAIPE is used, PEPs are disabled which greatly decreases the satellite communications bandwidth.

The present disclosure describes methods and systems that can achieve the high performance offered by PEPs for HAIPE-encrypted TCP traffic across satellite links. This method encodes and relays the original TCP flow information across HAIPE without any modification to the existing HAIPE, while preserving the same level of security. New TCP streams are created and encapsulate the HAIPE-encrypted original TCP packets in the new TCP streams. These new TCP streams can be natively handled by PEPs and thus the full TCP performance can be achieved. However, encapsulating TCP packets into new TCP streams creates a phenomenon called TCP meltdown.

As described above, the original TCP packets are encapsulated in an external TCP, resulting in a TCP-over-TCP tunnel. However, any TCP-over-TCP environment experiences a problem called TCP meltdown. In TCP-over-TCP, packet errors are recovered by the external TCP, and the internal TCP never experiences any packet loss. As a result, a Congestion Window (cwnd) of the internal TCP grows continuously without bound. However, the internal TCP's bandwidth cannot grow beyond the external TCP's bandwidth, the internal TCP's packets are queued up and eventually dropped. This results in a severe packet drop and no reply comes back from the receiver. Consequently, the internal TCP's Retransmission Time Out (RTO) timer expires, and the sender begins slow start. This process is repeated periodically and the gap time before the next slow start is increased by twice each time. When the gap time reaches 2 minutes, TCP considers the connection broken and gives up, causing TCP meltdown. These and other shortcomings are addressed by the disclosure herein.

FIG. 1 illustrates a system 100 for TCP communications. The system 100 can comprise one or more of a TCP encoder 102, an encryption device 104, a TCP generator 106, a Performance Enhancing Proxy (PEP) 108, and a satellite link 110. As shown, the TCP encoder 102, the encryption device 104, the TCP generator 106, and the PEP 108 are in communication via a private and/or public network 105 such as the Internet, a local area network, a wide area network, and/or a mesh network. Further, the PEP 108 is in communication with the satellite link 110. While the satellite link 110 is illustrated as communicating directly with the PEP 108, a person skilled in the art would appreciate the satellite link 110 can communication with the network 105, and thus communicate with the TCP encoder 102, the encryption device 104, and the TCP generator 106 via the network 105. Those skilled in the art will appreciate that the present methods may be used in systems that employ both digital and analog equipment. Further, one skilled in the art will appreciate that provided herein is a functional description and that the respective functions may be performed by software, hardware, or a combination of software and hardware.

The TCP encoder 102 encodes TCP flow information into received packets. The packets can be TCP packets, IPsec packets, or any type of packet associated with a packetized network. For example, the TCP encoder 102 can receive packets from another device via the network 105. In one exemplary embodiment, the TCP encoder 102 encodes the header of the received packets with flow information. The flow information can contain a flow ID, a TCP marker to indicate if the packet is a TCP packet, and/or flags. As will be appreciated by one skilled in the art, the flow information can contain any number of bits and information as necessary to facilitate the communication of the received packet. For example, the flow information can be encoded into an IP header of a received TCP packet. After the TCP encoder 102 has encoded the flow information into the received packet, the TCP encoder 102 can transmit the encoded packet to the encryption device 104 via the network 105.

In typical TCP connections, the Congestion Window is increased linearly to reach a maximum allowed bandwidth for the connection. For example, a sender of the TCP packets may continue to send packets until a packet is dropped during communication. The dropping of the packet indicates the network connection is being overload. The sender of the TCP packets receives an indication that the packet has been dropped, and the sender may reduce the congestion window size (e.g., by half, by a quarter, etc.) to better fit the bandwidth of the network. Stated differently, the sender of the TCP packets resets the congestion window, and then proceeds to incrementally increase the size of the congestion window until another packet is dropped, at which point the sender resets the congestion window again. Thus, during a stable period of network bandwidth, the size of the congestion window will fluctuate between the maximum allowable size (e.g., the size just after the TCP packet is dropped which causes the Congestion Window to be modified), and the size of the congestion window reset. However, when a TCP packet is encapsulated within another TCP packet, TCP meltdown can occur.

TCP meltdown occurs when the congestion window associated with the internal TCP packets (e.g., the TCP packets encapsulated within the another TCP packet) does not reset. Stated differently, TCP meltdown occurs when the congestion window associated with the internal TCP packets grows without bound. TCP meltdown occurs in this TCP-within-TCP packet environment because the internal TCP packets do not see any packet error because any packet errors are handled by the external TCP packet. Stated differently, if the external (e.g., outer) TCP packet is dropped, the external TCP congestion window is reset. However, the internal TCP packet does not see any error because the error is handled by the external TCP packet. Thus, the internal TCP packet never sees an error, and the congestion window for the internal TCP packet will continue to grow, as described above, because the congestion window is not reset. Eventually, the internal congestion window becomes larger than the external congestion window, which is not possible because the external TCP packet cannot include data that is larger than the external TCP's congestion window. Thus, the connection is determined to be broken, and a hard reset of the TCP connection is required to continue communicating.

In one exemplary embodiment, the TCP encoder 102 purposefully encodes an error into the received packet to avoid the TCP meltdown described above. That is, when the TCP encoder 102 encodes the received packet, the TCP encoder 102 encodes or creates an error with the received packet. In one example, the error is an artificial error that would not naturally occur but for the TCP encoder 102 introducing the error. The error causes the received packet to not reach the received packet's intended destination (e.g., the received packet is dropped during transmission). For example, the received packet may not reach the TCP generator 106 if the TCP encoder 102 transmits the encoded packet to the TCP generator 106. By artificially inducing the error, the TCP encoder 102 forces the internal congestion window to reset. Thus, the internal congestion window will not continue to grow, and the TCP meltdown can be avoided.

In one exemplary embodiment, the TCP encoder 102 purposefully encodes the error in the received packet based on one or more factors. For example, the TCP encoder 102 can generate an error with the received packet based on a time period since a last error was generated in a packet. The time period may be predetermined or the time period may be dynamically determined based on conditions associated with the system 100 such as the available bandwidth of the satellite link 110 or the free capacity of at least one of the TCP encoder 102, the encryption device 104, the TCP generator 106, the PEP 108, and/or the satellite link 110. The artificial error can be added to the second TCP packet based on a Round Trip Time (RTT) of the external TCP packet, an external error rate, or a RTT of the encoded first TCP packet. Thus, the TCP encoder 102 avoids the TCP meltdown by introducing the artificial error that cause the packet to be dropped.

The encryption device 104 receives packets and encrypts the received packets. The encryption device 104 can by any hardware or software configured to encrypt a received packet. In one example, the encryption device 104 encrypts the received packet using High Assurance Internet Protocol Encryptions (HAIPE). The encryption device 104 can encrypt the header and payload of the received packet. For example, the encryption device 104 can encrypt the TCP header and the payload of a received TCP packet. Further, the encryption device can add additional bits to the packet such as an Encapsulating Security Payload (ESP) header to the received packet. After the encryption device 104 encrypts the packet, the encryption device 104 can transmit the encrypted packet to the TCP generator 106.

The TCP generator 106 can generate new TCP streams based on received packets. For example, the TCP generator 106 can receive the encrypted packet from the encryption device 104, and generate a new TCP packet for the received packet. The TCP generator 106 then can transmit the new TCP packet via a TCP stream to another device. However the TCP generator 106 does not have to generate a TCP stream for all received packets. For example, some of the received packets may not be TCP packets, and thus do not need a TCP stream. In this example, the TCP generator 106 transmits the non-TCP packet to another device (e.g., the PEP 108) without generating a TCP stream.

In one exemplary embodiment, the TCP generator 106 generates a TCP packet based on flow information encoded into the packet (e.g., by the TCP encoder 102). For example, as explained above, the encryption device 104 can encrypt the TCP header, which would prevent a TCP stream from being generated by the TCP generator 106 because the TCP generator 106 cannot access the necessary TCP information. Thus, the TCP generator 106 uses the flow information encoded into the received packet, which is not encrypted by the encryption device 104, to generate a new TCP packet, which can then be transmitted via a TCP stream. In one exemplary embodiment, the TCP generator 106 generates a new IP header and a new TCP header based on the flow information encoded in the received packet. The TCP generator 106 then uses the received packet as the payload of the newly generated TCP packet. In this manner, the TCP generator 106 is capable of generating a new TCP pack that contains the received packet in the payload of the newly formed TCP packet. The TCP generator 106 then transmits the newly formed TCP packet to another device (e.g., the PEP 108). For example, the TCP generator 106 can transmit the newly formed TCP packet to the PEP 108. The PEP 108 in turn can transmit the newly formed TCP packet to the satellite link 110. The satellite link 110 can transmit the newly formed TCP packet to another PEP 108 via a satellite communications network, as will be explained in more detail with regards to FIG. 2.

In one exemplary embodiment, the TCP generator 106 purposefully encodes an error into the new packet to avoid TCP meltdown. That is, when the TCP generator 106 is generating a new packet based on the received packet, the TCP generator 106 encodes or creates an error with the new packet. In one example, the error is an artificial error that would not naturally occur but for the TCP generator 106 introducing the error. The error causes the new packet to not reach the new packet's intended destination (e.g., the new packet is dropped during transmission). By artificially inducing the error, the TCP generator 106 forces the internal congestion window to reset. Thus, the internal congestion window will not continue to grow, and the TCP meltdown can be avoided.

The TCP generator 106 can generate an error with the new packet based on one or more factors. For example, the TCP generator 106 can generate an error with the new packet based on a time period since a last error was generated in a new packet. The time period may be predetermined or the time period may be dynamically determined based on conditions associated with the system 100 such as the available bandwidth of the satellite link 110 or the free capacity of at least one of the TCP encoder 102, the encryption device 104, the TCP generator 106, the PEP 108, and/or the satellite link 110. The artificial error can be added to the new packet based on a Round Trip Time (RTT) of an external TCP packet, an external error rate, or a RTT of the another TCP packet. Thus, the TCP generator 106 avoids the TCP meltdown by introducing the artificial error that cause the packet to be dropped.

Figure 2:
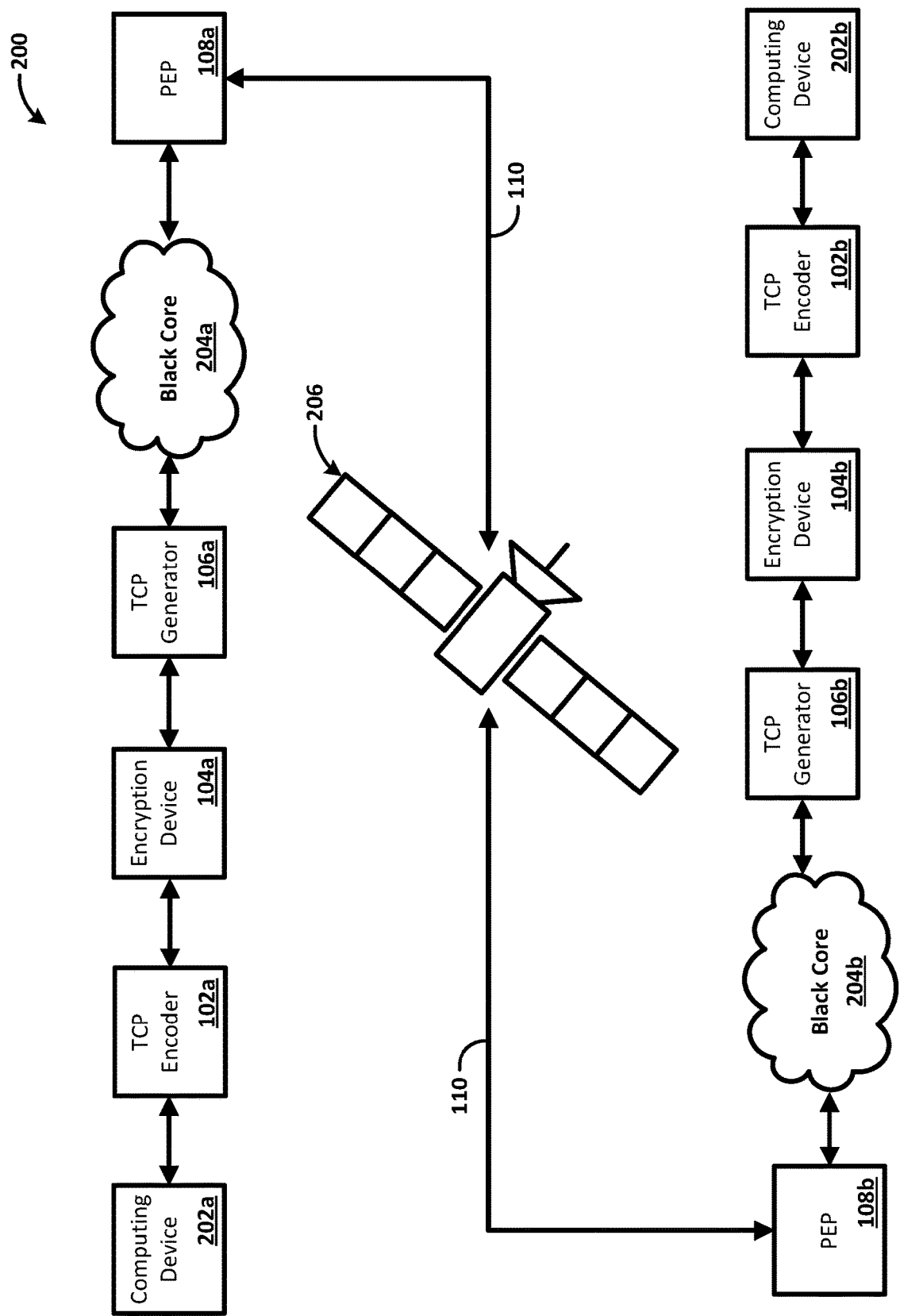
FIG. 2 is a block diagram illustrating an exemplary system.

FIG. 2 shows an exemplary system 200. Specifically, the system 200 illustrates a communication system for transporting communications from a computing device 202a to a computing device 202b. As shown, the system 200 comprises computing devices 202a, 202b; TCP encoders 102a, 102b; encryption devices 104a, 104b; TCP generators 106a, 106b; black cores 204a, 204b; PEPs 108a, 108; satellite links 110, and a satellite 206.

The computing devices 202a, 202b can be any computing device (e.g., the computing device 501 of FIG. 5) capable of communicating via a communications network. The computing devices 202a, 202b can transmit and receive data via the communications network. For example, the computing device 202a can transmit data to, and receive data from, the TCP encoder 102a. Similarly, the computing device 202b can transmit data to, and receive data from, the TCP encoder 102b. The data transmitted to, and received from, the TCP encoders 102a, 102b can be a packet, such as a TCP packet. In an example, the computing device 202a transmits a packet, via the system 200, to the computing device 202b.

The TCP encoder 102a receives the packet from the computing device 202a encodes TCP flow information into the received packet. The packet can be TCP packets, IPsec packets, or any type of packet associated with a packetized network. In an example, the TCP encoder 102a encodes the header of the received packets with flow information. The flow information can contain a flow ID, a TCP marker to indicate if the packet is a TCP packet, and/or flags. As will be appreciated by one skilled in the art, the flow information can contain any number of bits and/or information to facilitate the communication of the received packet. For example, the flow information can be encoded into an IP header of a received TCP packet. After the TCP encoder 102a has encoded the flow information into the received packet, the TCP encoder 102a can transmit the encoded packet to the encryption device 104a.

In an example, the TCP encoder 102a purposefully encodes an error into the received packet to avoid the TCP meltdown. That is, when the TCP encoder 102a encodes the packet received from the computing device 202a, the TCP encoder 102a encodes or creates an error with the received packet. In an example, the error is an artificial error that would not naturally occur but for the TCP encoder 102a introducing the error. The error causes the received packet to not reach the received packet's intended destination (e.g., the received packet is dropped during transmission). For example, if the TCP encoder 102a transmits the encoded packet to the TCP generator 106a, the received packet may not reach the TCP generator 106a. By artificially inducing the error, the TCP encoder 102a forces the internal congestion window to reset. Thus, the internal congestion window will not continue to grow, and the TCP meltdown can be avoided.

In one exemplary embodiment, the TCP encoder 102a purposefully encodes the error in the received packet based on one or more factors. For example, The TCP encoder 102a can generate an error with the received packet based on a time period since a last error was generated in a packet. The time period may be predetermined or the time period may be dynamically determined based on conditions associated with the system 200 such as the available bandwidth of the satellite links 110. The artificial error can be added to the packet based on a Round Trip Time (RTT) of the TCP packet, an error rate associated with an external TCP packet, or an error rate with the system 200. Thus, the TCP encoder 102*a* avoids the TCP meltdown by introducing the artificial error that cause the packet to be dropped.

The encryption device 104*a* receives packets from the TCP encoder 102*a* and encrypts the received packets. The encryption device 104*a* can by any hardware or software configured to encrypt a received packet. In one example, the encryption device 104*a* encrypts the received packet using High Assurance Internet Protocol Encryptions (HAIPE). The encryption device 104*a* can encrypt the header and payload of the received packet. For example, the encryption device 104*a* can encrypt the TCP header and the payload of a received TCP packet. Further, the encryption device can add additional bits to the packet such as an Encapsulating Security Payload (ESP) header to the received packet. After the encryption device 104*a* encrypts the packet, the encryption device 104*a* can transmit the encrypted packet to the TCP generator 106*a*.

The TCP generator 106*a* can generate new TCP streams based on packets received from the encryption device 104*a*. The TCP generator 106*a* can then transmit the new TCP packet via a TCP stream to another device (e.g., the PEP 108*a* via the black core 204*a*). However the TCP generator 106*a* does not have to generate a TCP stream for all received packets. For example, some of the received packets may not be TCP packets, and thus do not need a TCP stream. Thus, the TCP generator 106*a* transmits the non-TCP packet to another device (e.g., the PEP 108*a* via the black core 204*a*) without generating a TCP stream.

In an example, the TCP generator 106*a* generates a TCP packet based on flow information encoded into the packet (e.g., by the TCP encoder 102*a*). For example, as explained above, the encryption device 104*a* can encrypt the TCP header, which would prevent a TCP stream from being generated by the TCP generator 106*a* because the TCP generator 106*a* cannot access the necessary TCP information. Thus, the TCP generator 106*a* uses the flow information encoded into the received packet, which is not encrypted by the encryption device 104*a*, to generate a new TCP packet, which can then be transmitted via a TCP stream. In one exemplary embodiment, the TCP generator 106*a* generates a new IP header and a new TCP header based on the flow information encoded in the received packet. The TCP generator 106*a* then uses the packet received from the encryption device 104*a* as the payload of the newly generated TCP packet. In this manner, the TCP generator 106*a* is capable of generating a new TCP pack that contains the received packet in the payload of the newly formed TCP packet. The TCP generator 106*a* then transmits the newly formed TCP packet to another device (e.g., the PEP 108*a* via the black core 204*a*). The PEP 108*a* in turn can transmit the newly formed TCP packet to the satellite link 110. The satellite link 110 can transmit the newly formed TCP packet to another PEP (e.g., the PEP 108*b*) via a satellite 206.

In one exemplary embodiment, the TCP generator 106*a* purposefully encodes an error into the new packet to avoid TCP meltdown. That is, when the TCP generator 106*a* is generating a new packet based on the received packet, the TCP generator 106*a* encodes or creates an error with the new packet. In one example, the error is an artificial error that would not naturally occur but for the TCP generator 106*a* introducing the error. The error causes the new packet to not reach the new packet's intended destination (e.g., the new packet is dropped during transmission). By artificially inducing the error, the TCP generator 106*a* forces the internal congestion window to reset. Thus, the internal congestion window will not continue to grow, and the TCP meltdown can be avoided.

The TCP generator 106*a* can generate an error with the new packet based on one or more factors. For example, the TCP generator 106*a* can generate an error with the new packet based on a time period since a last error was generated in a new packet. The time period may be predetermined or the time period may be dynamically determined based on conditions associated with the system 100 such as the available bandwidth of the satellite link 110 or the free capacity of at least one of the TCP encoder 102, the encryption device 104, the TCP generator 106*a*, the PEP 108, and/or the satellite link 110. The artificial error can be added to the new packet based on a Round Trip Time (RTT) of an external TCP packet, an external error rate, or a RTT of the another TCP packet. Thus, the TCP generator 106*a* avoids the TCP meltdown by introducing the artificial error that cause the packet to be dropped.

The black core 204*a* can receive the packet from the TCP generator 106*a*. The black core 204*a* can comprise one or more computing devices that are not secured. Stated differently, the black core 204*a* comprises one or more computing devices that are subject to network attacks such as packet eavesdropping or modification because they are not secured. For example, the block core 204*a* can be a communications network (e.g., the Internet) run by a third party (e.g., Internet Service Providers). The black core 204*a* can transmit the packet received from the TCP generator 106*a* to the PEP 108*a*. While the system 200 shows the black core 204*a*, a person skilled in the art would appreciate that the system 200 may not contain a black core.

The PEP 108*a* receives the packet from the black core 204*a* and transmits the received packet to the satellite 206 via the communications link 110. In an example, the PEP 108*a* uses the flow information encoded by the TCP encoder 102*a* to accelerate the speed of transmitting the received packet via the satellite 206. That is, in this example, if the TCP encoder 102*a* did not encode the flow information into the received packet, the PEP 108*a* would not be capable of accelerating the packet transmission speed via the satellite 206 because the TCP information would be encrypted by the encryption device 104*a*. Thus, the TCP encoder 102*a* encoding the flow information, which the TCP generator 106*a* utilizes to generate the new TCP packet, allows the PEP 108*a* to process the new TCP packet like a normal TCP packet even though the original TCP packet was encrypted by the encryption device 104*a*. Accordingly, the system 200 has the benefit of utilizing PEPs to improve satellite communications, while also encrypting the original packet for secure communications. In an example, the PEP 108*a* transmits the packet to the PEP 108*b* via the communications links 110 and the satellite 206.

The PEP 108*b* receives the packet from the communication link 110. In an example, the PEP 108*b* then transmits the packet to the black core 204*b*. The black core 204*b* then transmits the received packet to the TCP generator 106*b*. In an example, the TCP generator 106*b* generates an error in the received packet. That is, when the TCP generator 106*b* receives the packet, the TCP generator 106*b* creates an error with the received packet. In one example, the error is an artificial error that would not naturally occur but for the TCP generator 106*b* introducing the error. The error causes the received packet to not reach the received packet's intended destination (e.g., the received packet is dropped during transmission). For example, the received packet may not reach the encryption device 104*b* if the TCP generator 106*b* transmits the encoded packet to the encryption device 104*b*. In one exemplary embodiment, the TCP generator 106*b* purposefully encodes the error in the received packet. For example, the TCP generator 106*b* can generate an error with the received packet based on a time period since a last error was generated in a packet. The time period may be predetermined or the time period may be dynamically determined based on conditions associated with the system 200 such as the available bandwidth of the satellite links 110 or the free capacity of at least one of the TCP encoders 102*a*, 102*b*, the encryption devices 104*a*, 104*b*, the TCP generators 106*a*, 106*b*, the PEPs 108*a*, 108*b*, the satellite links 110, the computing devices 202*a*, 202*b*, the black cores 204*a*, 204*b*, and/or the satellite 206. The artificial error can be added to the second TCP packet based on a Round Trip Time (RTT) of the external TCP packet, an external error rate, or a RTT of the encoded first TCP packet. As will be appreciated by on skilled in the art, the TCP generator 106*b* does not add the error to every packet. Rather, the TCP generator 106*b* can selectively add an error to a TCP packet based on one or more criteria.

The TCP generator 106*b* then transmits the received packet to the encryption device 104*b*, which unencrypts the received packet. The encryption device 104*b* then transmits the unencrypted packet to the TCP encoder 102*b*, which in turn provides the unencrypted packet to the computing device 202*b*. In another example, the encryption device 104*b* transmits the unencrypted packet directly to the computing device 202*b*. While the system 200 has been described as the computing device 202*a* transmitting a packet to the computing device 202*b* via the system 200, the system 200 is capable of operating in the reverse order. That is, the computing device 202*b* can transmit a packet to the computing device 202*a* via the system 200. Thus, the computing devices 202*a*, 202*b*, are capable of communicating back and forth via the system 200.

Figure 3:
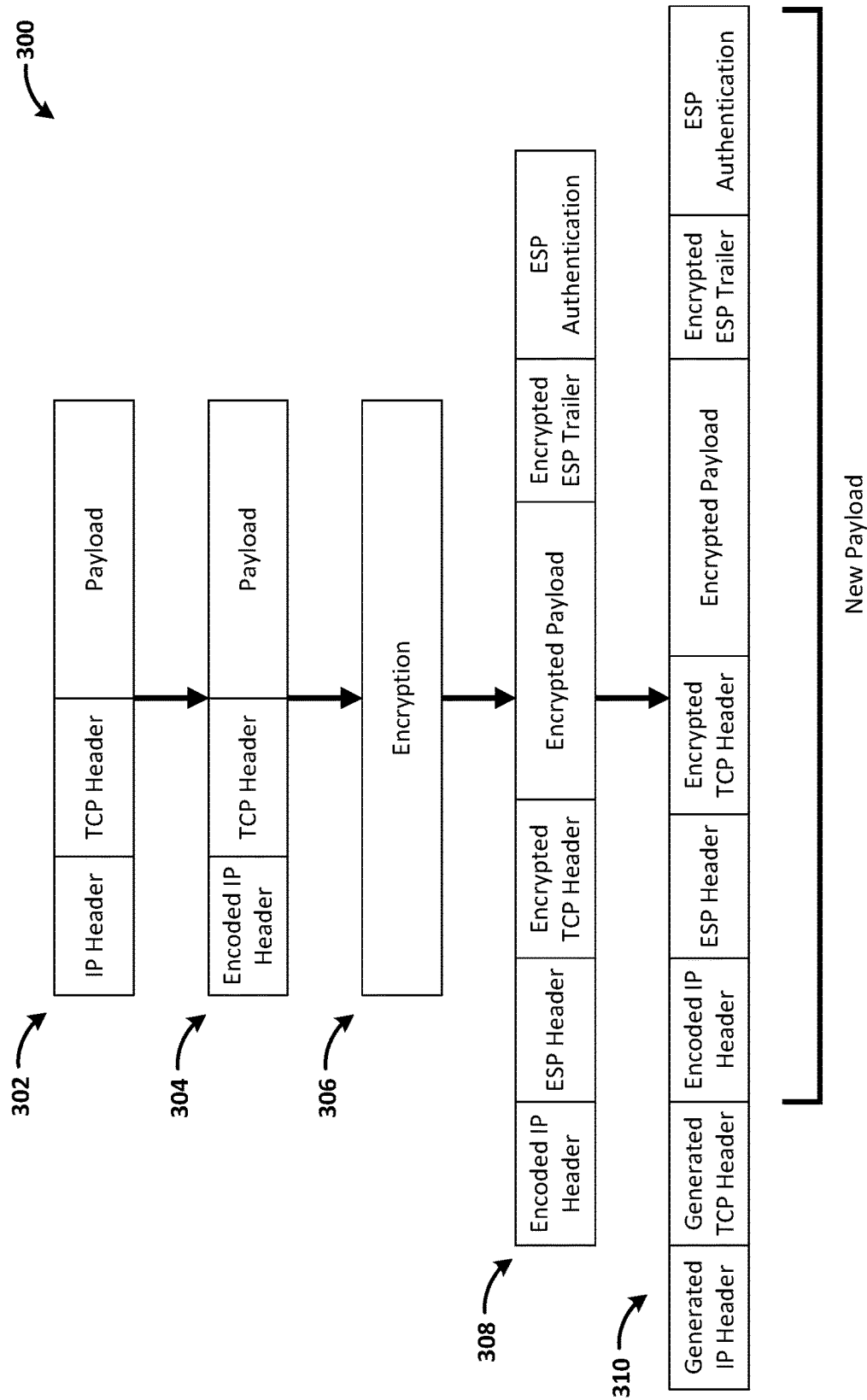
FIG. 3 is a diagram illustrating an exemplary TCP packet.

FIG. 3 shows a flowchart of a packet 300 as the packet is transmitted through the system 200 of FIG. 2. At 302, a TCP packet is received (e.g., by the encoders 102*a*, 102*b*, from the computing devices 202*a*, 202*b*). As shown, the TCP packet comprises an IP header, a TCP header, and a payload. While a TCP packet is shown for ease of explanation, the packet may be any type of packet. Further, as will be appreciated by one skilled in the art, the packet may contain additional fields or less fields. At 304, the IP header is replaced with an encoded IP header (e.g., by the encoders 102*a*, 102*b*). In an example, if the TCP packet is created using the Internet Protocol version 4 (IPv4), the IP ID can be encoded by the encoders to create the flow ID in the encoded IP header. Specifically, the 16 bits of the IP ID are replaced with a 16 bit flow ID. Further, the 13 bits of the Fragment Offset of the IPv4 packet can be used such that 1 bit indicates a TCP marker, 3 bits indicate TCP flags, and the remaining 9 bits are reserved. As another example, when only the 8-bit Type of Serve (ToS) field is allowed for encoding, 6 bits of ToS are replaced with a 6-bit flow ID. Further, the remaining 2 bits can be used for TCP marker and TCP flags. As another example, if the TCP packet is created using the Internet Protocol version 6 (IPv6), the 20 bits of the Flow Label are used such that 1 bit indicates a TCP marker, 3 bits indicate the TCP flags, and the remaining 16 bits are used for the Flow ID. The rest of the TCP packet remains the same (e.g., the TCP header and the payload are not modified). At 306, the TCP packet with the encoded header is encrypted (e.g., by the encryption devices 104*a*, 104*b*). In an example, the TCP packet is encrypted using High Assurance Internet Protocol Encryptions (HAIPE).

At 308, the packet is encrypted. The encryption process may add new fields to the packet, as well as leaving some fields unencrypted. Specifically, the encrypted packet still contains the encoded header, which is unencrypted. The encrypted packet however now contains new fields, such as an ESP header, an encrypted TCP header, an encrypted payload, an encrypted ESP trailer, and an ESP authentication field. In an example, the TCP packet is encrypted using Internet Protocol Security (IPsec). As an example, the TCP packet may be encrypted using the IPsec Tunnel mode with 8-bit ToS field bypass, which encrypts the IP header except the ToS field and the payload of the TCP Packet. As another example, the TCP packet may be encrypted using the IPsec Transport mode, which encrypts only the payload of the TCP packet. At 310, a new packet is generated (e.g., by the TCP generators 106*a*, 106*b*). Specifically, a new IP header and a new TCP header are generated, as shown by the generated IP header and the generated TCP header. The encrypted packet (e.g., at 308 described above) is now treated as the payload of the newly generated packet. Stated differently, the payload of the new packet is the encrypted packet, which results in the encrypted packet being an internal packet (e.g., an internal TCP packet) and the newly generated packet being an external packet (e.g., an external TCP packet).

Figure 4:
FIG. 4 is a flowchart illustrating an exemplary method.

FIG. 4 is a flowchart of an example method 400. At step 405, a first transmission control protocol (TCP) packet is received. For example, the TCP encoder 102 receives the first TCP packet (e.g., from the TCP/IP device 202*a*, 202*b*).

At step 410, the first TCP packet is encoded. For example, the TCP encoder 102 can encode the first TCP packet with flow information. The TCP encoder 102 may transmit the encoded first TCP packet to another device (e.g., the encryption device 104, the TCP generator 106, the PEP 108, etc.). The flow information can be at least one of a flow ID, a TCP marker to indicate if the packet is a TCP packet, and/or flags At step 415, the encoded first TCP packet is encrypted. For example, the encryption device 104 receives the encoded first TCP packet (e.g., from the TCP encoder 102). The encryption device 104 can then encrypt the encoded first TCP packet. The encryption device 104 can use High Assurance Internet Protocol Encryptions (HAIPE). Once the encoded first TCP packet is encrypted, the encryption device 104 can transmit the encrypted packet to another device (e.g., the TCP generator 106, the PEP 108, etc.).

At step 420, an external TCP packet is generated. For example, the TCP generator 106 can generate a new TCP packet, which is the external TCP packet. The external TCP packet can be based on the encrypted packet. For example, the TCP generator 106 receives the encrypted packet (e.g., from the encryption device 104), and the TCP generator 106 can generate a new packet that has the encrypted packet as the payload of the new packet. Thus, the new packet is an external TCP packet, and the encrypted packet is the internal TCP packet. Stated differently, the encrypted TCP packet is the payload of the external TCP packet.

At step 425, the external TCP packet is transmitted. The TCP generator 106 transmits the external TCP packet. For example, the TCP generator 106 transmits the external TCP packet based on the flow information encoded into the first TCP packet. As an example, the TCP generator 106 transmits the external TCP packet to the PEP 108, and the PEP 108 can in turn then transmit the external TCP packet via a satellite communications link (e.g., the satellite link 110, the satellite 206, etc.). The PEP 108 can transmit the external packet to another PEP via the satellite communications.

At step 430, a second TCP packet is received. For example, the TCP encoder 102 receives the second TCP packet (e.g., from the TCP/IP device 202a, 202b).

At step 435, an artificial error is added to the second TCP packet. For example, the TCP encoder 102 and/or the TCP generator 106 can encode an artificial error into the second TCP packet. The artificial error can ensure that the second TCP packet does not reach an intended destination of the second TCP packet. In one example, the artificial error is purposefully generated by the TCP encoder 102 and/or the TCP generator 106. Stated differently, the artificial error is an error that would not naturally occur but for the TCP encoder 102 and/or the TCP generator 106 generating the error. The artificial error can be added to the second TCP packet based on a Round Trip Time (RTT) of the external TCP packet, an external error rate, or a RTT of the encoded first TCP packet. The artificial error can be added to prevent TCP meltdown. The artificial error can cause the encrypted second TCP packet to be dropped during transmission of the encrypted second TCP packet The artificial error can cause the congestion window of the second TCP packet to be reset to prevent the occurrence of the TCP meltdown.

At step 440, the second TCP packet 440 is encoded. For example, the TCP encoder 102 can encode the second TCP packet with flow information. The TCP encoder 102 may transmit the encoded second TCP packet to another device (e.g., the encryption device 104, the TCP generator 106, the PEP 108, etc.).

At step 445, the second TCP packet is encrypted. For example, the encryption device 104 receives the encoded second TCP packet (e.g., from the TCP encoder 102). The encryption device 104 can then encrypt the encoded second TCP packet. The encryption device 104 can use High Assurance Internet Protocol Encryptions (HAIPE). Once the encoded second TCP packet is encrypted, the encryption device 104 can transmit the encrypted packet to another device (e.g., the TCP generator 106, the PEP 108, etc.).

At step 450, the encrypted second TCP packet is transmitted. For example, the encryption device 104 transmits the encrypted second TCP packet (e.g., to the TCP generator 106). However, due to the artificial error with the encrypted second TCP packet, the encrypted second TCP packet never reaches the destination (e.g., the TCP generator 106, the PEP 108, the satellite link 110, etc.) of the second TCP packet. Further, by not reaching the intended destination, the encrypted second TCP packet prevents TCP meltdown by resetting the congestion window associated with the internal TCP packet.

Figure 5:
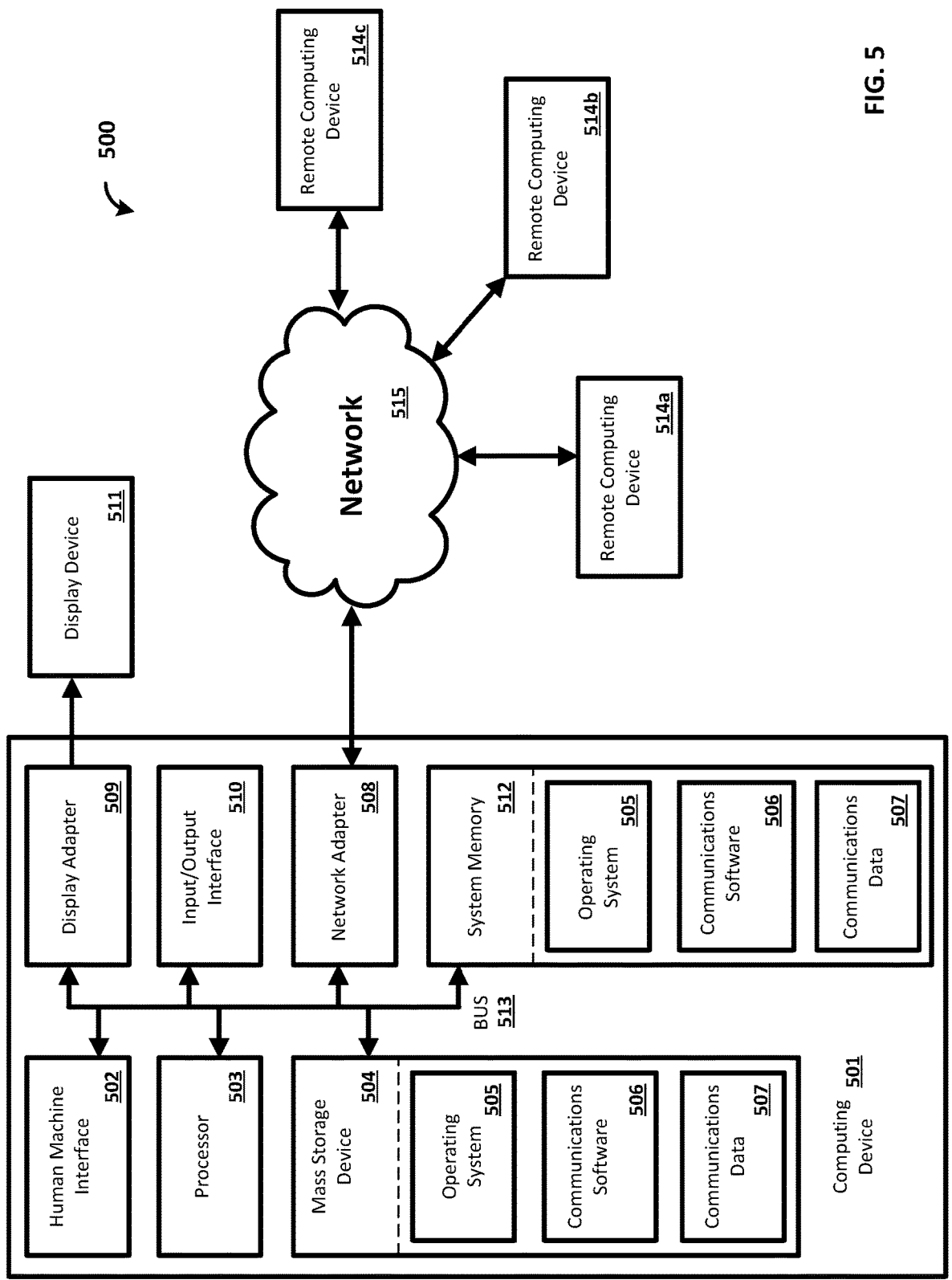
FIG. 5 is a block diagram illustrating an exemplary computing system.

FIG. 5 shows an example of an operating environment 500 including the TCP encoder 102, the encryption device 104, the TCP generator 106, the PEP 108, the TCP/IP devices 202a, 202b, the black cores 204a, 204, and/or the satellite 206. The operating environment 500 is only an example of an operating environment and is not intended to suggest any limitation as to the scope of use or functionality of operating environment architecture. Neither should the operating environment 500 be interpreted as having any dependency or requirement relating to any one or combination of components illustrated in the operating environment 500.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise programmable consumer electronics, network PCs, minicomputers, mainframe computers, smart devices, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods can also be practiced in grid-based and distributed computing environments where tasks are performed by remote processing devices that are linked through a communications network. In a distributed computing environment, program modules can be located in local and/or remote computer storage media including memory storage devices.

Further, one skilled in the art will appreciate that the systems and methods disclosed herein can be implemented via a general-purpose computing device in the form of a computing device 501. The computing device 501 can comprise one or more components, such as one or more processors 503, a system memory 512, and a bus 513 that couples various components of the computing device 501 including the one or more processors 503 to the system memory 512. In the case of multiple processors 503, the system can utilize parallel computing.

The bus 513 can comprise one or more of several possible types of bus structures, such as a memory bus, memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 513, and all buses specified in this description can also be implemented over a wired or wireless network connection and one or more of the components of the computing device 501, such as the one or more processors 503, a mass storage device 504, an operating system 505, communications software 506, communications data 507, a network adapter 508, a system memory 512, an Input/Output Interface 510, a display adapter 509, a display device 511, and a human machine interface 502, can be contained within one or more remote computing devices 514a,b,c at physically separate locations, connected through buses of this form, in effect implementing a fully distributed system.

The computing device 501 typically comprises a variety of computer readable media. As an example, readable media can be any available media that is accessible by the computing device 501 and comprises, for example and not meant to be limiting, both volatile and non-volatile media, removable and non-removable media. The system memory 512 can comprise computer readable media in the form of volatile memory, such as random access memory (RAM), and/or non-volatile memory, such as read only memory (ROM). The system memory 512 typically can comprise data such as the communications data 507 and/or program modules such as operating system 505 and communications software 506 that are accessible to and/or are operated on by the one or more processors 503.

In another example, the computing device 501 can also comprise other removable/non-removable, volatile/non-volatile computer storage media. The mass storage device 504 can provide non-volatile storage of computer code, computer readable instructions, data structures, program modules, and other data for the computing device 501. For example, a mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, an operating system 505 and communications software 506. One or more of the operating system 505 and the communications software 506 (or some combination thereof) can comprise program modules. The communications data 507 can also be stored on the mass storage device 504. The communications data 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple locations within the network 515.

In an example, the user can enter commands and information into the computing device 501 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like. These and other input devices can be connected to the one or more processors 503 via a human machine interface 502 that is coupled to the bus 513, but can be connected by other interface and bus structures, such as a parallel port, game port, an IEEE 1394 Port (also known as a Firewire port), a serial port, network adapter 508, and/or a universal serial bus (USB).

In yet another example, a display device 511 can also be connected to the bus 513 via an interface, such as a display adapter 509. It is contemplated that the computing device 501 can have more than one display adapter 509 and the computing device 501 can have more than one display device 511. For example, a display device 511 can be a monitor, an LCD (Liquid Crystal Display), light emitting diode (LED) display, television, smart lens, smart glass, display of a smart device, and/or a projector. In addition to the display device 511, other output peripheral devices can comprise components such as speakers (not shown) and a printer (not shown) which can be connected to the computing device 501 via Input/Output Interface 510. Any step and/or result of the methods can be output in any form to an output device. Such output can be any form of visual representation, including, but not limited to, textual, graphical, animation, audio, tactile, and the like. The display 511 and the computing device 501 can be part of one device, or separate devices.

The computing device 501 can operate in a networked environment using logical connections to one or more remote computing devices 514*a,b,c*. By way of example, a remote computing device 514*a,b,c* can be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. As an example, remote computing devices 514*a,b,c* can be the TCP encoder 102, the encryption device 104, the TCP generator 106, and/or the PEP 108. Logical connections between the computing device 501 and a remote computing device 514*a,b,c* can be made via a network 515, such as a local area network (LAN) and/or a general wide area network (WAN). Such network connections can be through a network adapter 508. A network adapter 508 can be implemented in both wired and wireless environments. Such networking environments are conventional and commonplace in dwellings, offices, enterprise-wide computer networks, intranets, and the Internet. The network 515 can also comprise a Bluetooth™ or Wi-Fi.

For purposes of illustration, application programs and other executable program components such as the operating system 505 are shown herein as discrete blocks, although it is recognized that such programs and components can reside at various times in different storage components of the computing device 501, and are executed by the one or more processors 503 of the computing device 501. An implementation of the communications software 506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with specific examples, it is not intended that the scope be limited to the particular examples set forth, as the examples herein are intended in all respects to be possible examples rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible nonexpress basis for interpretation, including: matters of logic with respect to arrangement of steps or operational flow; plain meaning derived from grammatical organization or punctuation; the number or type of examples described in the specification.

It will be apparent to those skilled in the art that various modifications and variations can be made without departing from the scope or spirit. Other examples will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   receiving a first Transmission Control Protocol (TCP) packet;
   encoding the first TCP packet, wherein the encoded first TCP packet comprises TCP flow information;
   encrypting the encoded first TCP packet;
   generating an external TCP packet, wherein the encrypted encoded first TCP packet is a payload of the external TCP packet;
   transmitting the external TCP packet based on the TCP flow information;
   receiving a second TCP packet;
   adding an artificial error to the second TCP packet, wherein the artificial error prevents an occurrence of TCP meltdown;
   encoding the second TCP packet;
   encrypting the encoded second TCP packet; and
   transmitting the encrypted encoded second TCP packet, wherein the encrypted encoded second TCP packet does not reach an intended destination of the encrypted encoded second TCP packet due to the artificial error.

2. The method of claim 1, wherein the encoded first TCP packet and the encoded second TCP packet are encrypted using High Assurance Internet Protocol Encryptions (HAIPE).

3. The method of claim 1, wherein transmitting the external TCP packet based on the TCP flow information comprises:
   transmitting the external TCP packet to a Performance Enhancing Proxy (PEP), wherein the PEP transmits the external TCP packet to a satellite network.

4. The method of claim 1, wherein adding the artificial error to the second TCP packet occurs at a rate based on a Round Trip Time (RTT) of the external TCP packet, an external error rate, or a RTT of the encoded first TCP packet.

5. The method of claim 1, wherein the TCP flow information comprises at least one of: a flow ID, a TCP marker to indicate if the packet is a TCP packet, and/or flags.

6. The method of claim 1, wherein the artificial error causes the encrypted encoded second TCP packet to be dropped during transmission of the encrypted encoded second TCP packet.

7. The method of claim 1, wherein the artificial error causes a congestion window associated with the second TCP packet to be reset to prevent the occurrence of TCP meltdown.

8. A system, comprising:
   an encoder, configured to:
      receive a first Transmission Control Protocol (TCP) packet,
      encode the first TCP packet, wherein the encoded first TCP packet comprises TCP flow information,
      transmit the encoded first TCP packet,
      receive a second TCP packet,
      encode an artificial error in the second TCP packet, wherein the artificial error prevents an occurrence of TCP meltdown, and
      transmit the second TCP packet, wherein the second TCP packet does not reach an intended destination of the second TCP packet due to the artificial error; and
   a packet generator, configured to:
      receive an encrypted TCP packet comprising the encoded first TCP packet,
      generate an external TCP packet, wherein the encrypted TCP packet is a payload of the external TCP packet, and
      transmit the external TCP packet based on the TCP flow information.

9. The system of claim 8, wherein the encrypted TCP packet is encrypted using High Assurance Internet Protocol Encryptions (HAIPE).

10. The system of claim 8, further comprising a Performance Enhancing Proxy (PEP) configured to:
    receive the external TCP packet; and
    transmit the external TCP packet to a satellite network.

11. The system of claim 8, wherein the encoder is further configured to encode the artificial error in the second TCP packet at a rate based on a Round Trip Time (RTT) of the external TCP packet, an external packet error rate, or a RTT of the encoded first TCP packet.

12. The system of claim 8, wherein the TCP flow information comprises at least one of: a flow ID, a TCP marker to indicate if the packet is a TCP packet, and/or flags.

13. The system of claim 8, wherein the artificial error causes the second TCP packet to be dropped during transmission of the second TCP packet.

14. The system of claim 8, wherein the artificial error causes a congestion window associated with the second TCP packet to be reset to prevent the occurrence of TCP meltdown.

15. An apparatus, comprising,
    a processor; and
    a memory comprising processor executable instructions that, when executed by the processor, cause the apparatus to:
       receive a first Transmission Control Protocol (TCP) packet;
       encode the first TCP packet, wherein the encoded first TCP packet comprises first TCP flow information;
       encrypt the encoded first TCP packet;
       generate an external TCP packet, wherein the encrypted encoded first TCP packet is a payload of the external TCP packet;
       transmit the external TCP packet based on the TCP flow information;
       receive a second TCP packet;
       add an artificial error to the second TCP packet, wherein the artificial error prevents an occurrence of TCP meltdown;
       encode the second TCP packet;
       encrypt the encoded second TCP packet; and
       transmit the encrypted encoded second TCP packet, wherein the encrypted encoded second TCP packet does not reach an intended destination of the encrypted encoded second TCP packet due to the artificial error.

16. The apparatus of claim 15, wherein the processor executable instructions that cause the apparatus to encrypt the encoded first TCP packet further cause the apparatus to encrypt the encoded first TCP packet using High Assurance Internet Protocol Encryptions (HAIPE), and wherein the processor executable instructions that cause the apparatus to encrypt the encoded second TCP packet further cause the apparatus to encrypt the encoded second TCP packet using HAIPE.

17. The apparatus of claim 15, wherein the processor executable instructions that cause the apparatus to transmit the external TCP packet based on the TCP flow information further cause the apparatus to:
  transmit the external TCP packet to a Performance Enhancing Proxy (PEP), wherein the PEP transmits the external TCP packet to a satellite network.

18. The apparatus of claim 15, wherein the processor executable instructions that cause the apparatus to add the artificial error to the second TCP packet futher cause the apparatus to add the artificial error to the second TCP packet at a rate based on a Round Trip Time (RTT) of the external TCP packet, an external packet error rate, and a RTT of the encoded first TCP packet.

19. The apparatus of claim 15, wherein the artificial error causes the encrypted encoded second TCP packet to be dropped during transmission of the encrypted encoded second TCP packet.

20. The apparatus of claim 15, wherein the artificial error causes a congestion window associated with the second TCP packet to be reset to prevent the occurrence of TCP meltdown.

\* \* \* \* \*